(12) United States Patent
Koenig

(10) Patent No.: US 6,851,685 B2
(45) Date of Patent: Feb. 8, 2005

(54) HAND TRUCK WITH RETRACTING LOAD SHIFTING LEVER

(76) Inventor: Larry D. Koenig, P.O. Box 1037, Williamsburg, IA (US) 52361

( * ) Notice: Subject to any disclaimer, the term of this patent is extended or adjusted under 35 U.S.C. 154(b) by 0 days.

(21) Appl. No.: 10/289,284

(22) Filed: Nov. 7, 2002

(65) Prior Publication Data

US 2004/0090027 A1 May 13, 2004

(51) Int. Cl.⁷ ................................................. B62B 1/00
(52) U.S. Cl. .............................. 280/47.27; 280/47.28; 280/47.29
(58) Field of Search .................. 280/47.11, 47.131, 280/47.15, 47.16, 47.17, 47.19, 47.21, 47.27, 47.28, 47.29, 47.33; 414/449, 445, 456, 490

(56) References Cited

U.S. PATENT DOCUMENTS

| | | | | |
|---|---|---|---|---|
| 1,539,933 A | * | 6/1925 | Britton | 280/47.29 |
| 2,197,587 A | * | 4/1940 | Miller | 280/47.27 |
| 2,607,606 A | | 8/1952 | Millen | |
| 2,653,033 A | | 9/1953 | Chinette et al. | |
| 2,680,027 A | * | 6/1954 | Puydt et al. | 280/47.28 |
| 2,710,106 A | | 6/1955 | Hanson | |
| 3,193,123 A | * | 7/1965 | Wouden | 414/456 |
| 3,278,061 A | * | 10/1966 | Christensen | 414/456 |
| 3,403,800 A | * | 10/1968 | Botello | 414/490 |
| 3,746,360 A | | 7/1973 | Crawford | |
| 3,878,958 A | * | 4/1975 | Ring | 414/490 |
| 4,762,333 A | | 8/1988 | Mortenson | |
| 4,921,270 A | * | 5/1990 | Schoberg | 280/47.27 |
| 4,974,862 A | * | 12/1990 | Maupin | 280/47.27 |
| 5,118,124 A | | 6/1992 | Storay et al. | |
| 5,290,051 A | * | 3/1994 | Olson | 280/47.27 |
| 6,237,925 B1 | | 5/2001 | Koenig | |

* cited by examiner

Primary Examiner—Hau Phan
(74) Attorney, Agent, or Firm—Siemens Patent Services, LC

(57) ABSTRACT

A hand truck having load shifting member which tilts the hand truck under conditions of greater leverage than that available by grasping the frame of the hand truck is disclosed. The load shifting member comprises a spring retracting lever rotatably attached to an axle journaled from the frame of the hand truck such that when in a retracted position, the lever is substantially parallel to the frame. Pulling on the upper end of the lever rotates the lever such that the lower end of the lever engages the lower portion of the hand truck frame, shifting the center of gravity of the loaded hand truck such that it may be more easily tilted to a position for moving the hand truck. A spring returns the lever to a retracted position when not in use.

7 Claims, 6 Drawing Sheets

HAND TRUCK WITH RETRACTING LOAD SHIFTING LEVER

RELATED APPLICATION

This application is related to U.S. patent application Ser. No. 09/332,859, filed on Jun. 15, 1999, subsequently issued as U.S. Pat. No. 6,237,925 B1, on May 29, 2001.

BACKGROUND OF THE INVENTION

1. Field of the Invention

The present invention relates to hand trucks, and more particularly to single axle hand trucks having load shifting apparatus. The load shifting apparatus is employed to assist in inclining the hand truck from a vertical stance in preparation for wheeling the hand truck and its load to a new location.

2. Description of the Prior Art

In operation, hand trucks are usually loaded with bulky and heavy objects when the load bearing frame of the hand truck is substantially vertical. The load is placed on a supporting plate, or load plate. To roll the loaded hand truck to a new location, the hand truck is tilted from its initial vertical stance and drawn or pushed by hand. When the hand truck arrives at its destination, where it is unloaded, it is again placed in the vertical stance. It is often very difficult for a single person to tilt and upright the hand truck if the load is heavy or particularly bulky.

Modifications to hand trucks for shifting loads and the center of gravity have been proposed in the prior art. U.S. Pat. No. 3,746,360, issued to Burdette B. Crawford on Jul. 17, 1973, sets forth an arrangement enabling a load bearing frame of a hand truck to be tilted and supported on a member engaging the ground. However, in the hand truck of Crawford, the main load bearing wheels are mounted on side frames which are vertically slidably connected to the load bearing frame and load plate. By contrast, the load bearing frame of the present invention is monolithic in that there are no relatively moving parts corresponding to the side frames of Crawford. The device of Crawford includes a hand operated linkage absent in the present invention. The present invention utilizes a hand operated lever pivotally fixed to the axle to accomplish load shifting, whereas the device of Crawford causes the main wheels to be retracted relative to the load bearing frame and load plate.

A hand truck seen in U.S. Pat. No. 2,607,606, issued to Stanley S. Millen on Aug. 19, 1952, has an auxiliary axle disposed below the principal axle and located near the load plate, in the manner of the present invention. The auxiliary axle supports rollers which supplement the principal wheels. Unlike the device of Millen, the present invention has only a single axle and a lever which selectively engages the frame of the novel hand truck, thereby shifting the load of the hand truck from the vertical to a tilted position.

U.S. Pat. No. 2,653,033, issued to Joseph C. Chinette, et al., on Sep. 22, 1953, describes a hand truck which is adjustable to vary position of the load plate relative to the principal wheels. However, there is no lever which selectively engages the frame when shifting the load as the hand truck is inclined from the vertical, as seen in the present invention.

A hand truck seen in U.S. Pat. No. 2,710,106, issued to Alfred H. Hanson on Jun. 7, 1955, includes spurs fixed solidly to the frame which engage the ground when a load is being shifted. However, the hand truck of Hanson does not utilize a lever to shift the load from the vertical stance to a tilted position, as in the present invention.

In U.S. Pat. No. 4,762,333, issued to Carl N. Mortenson on Aug. 9, 1988, the wheels are movable relative to the load bearing frame, whereas the wheels are rotatably mounted in fixed location on the load bearing frame in the present invention. Load shifting is accomplished by Mortenson with the weight of the load and hand truck imposed on the wheels. In the present invention, a frame engaging lever pivotally mounted to the axle assists in shifting the load from the vertical stance to a tilted position.

U.S. Pat. No. 5,118,124, issued to Craig F. Storay, et al., on Jun. 2, 1992, illustrates another hand truck wherein the main wheels are adjustably positioned relative to the load bearing frame. In the device of Storay, et al., rockers come to contact the ground and temporarily support the load bearing frame. By contrast, the present invention utilizes only a single axle and pair of wheels, and an axle mounted lever for assisting in shifting the load from the vertical stance to a tilted position.

None of the above inventions and patents, taken either singly or in combination, is seen to describe the instant invention as claimed.

SUMMARY OF THE INVENTION

The present invention sets forth improvements to hand trucks which enable a single person to tilt the hand truck more easily when the hand truck is loaded. Briefly stated, the hand truck is tilted under conditions of relatively great leverage by a retracting lever or load shifting mechanism. Final tilting is accomplished after retracting the lever mechanism by grasping the load bearing frame in conventional manner, which affords reduced leverage compared to that available from the tilting mechanism.

The load bearing frame comprises a single, rigid assembly devoid of longitudinally movable parts. A novel tilting or load shifting lever is fixed to the axle, and is constrained only to pivot or rotate about its axis of pivot and engage the lower portion of the load bearing frame. Thus overall construction of the novel hand truck is uncomplicated compared to the many prior art devices which achieve similar results. Moreover, the present invention may be practiced by modifying a conventional hand truck to include the novel tilting or load shifting mechanism.

The leverage arrangement is hand operated. An elongate lever projects upwardly, generally parallel to the back of the hand truck, to a location where it is conveniently grasped by hand. Pulling the upper end of the lever toward the user tilts the load bearing frame from the vertical stance to a tilted position without the need for excessive exertion by the user.

Accordingly, it is one object of the invention to enable a single person to maneuver and wheel a loaded hand truck.

It is another object of the invention to keep the users hands in a position to easily grasp the load bearing frame after tilting the hand truck from the erect position.

It is a further object of the invention to assist a person in tilting and uprighting a loaded hand truck.

Another object of the invention is to easily return an inclined hand truck to the upright position while maintaining balance and control by the user.

A further object of the invention is to eliminate back strain and other injuries to users of hand trucks.

Still another object of the invention is to provide a tilting mechanism offering a relatively great level of leverage compared to that available by manually grasping and maneuvering the load bearing frame.

An additional object of the invention is to form the load bearing frame as a single, rigid assembly devoid of longitudinally movable parts.

Still another object of the invention is to employ a conventional hand truck in practicing the invention, the improvement being achieved by securing the novel load shifting mechanism to the conventional hand truck.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
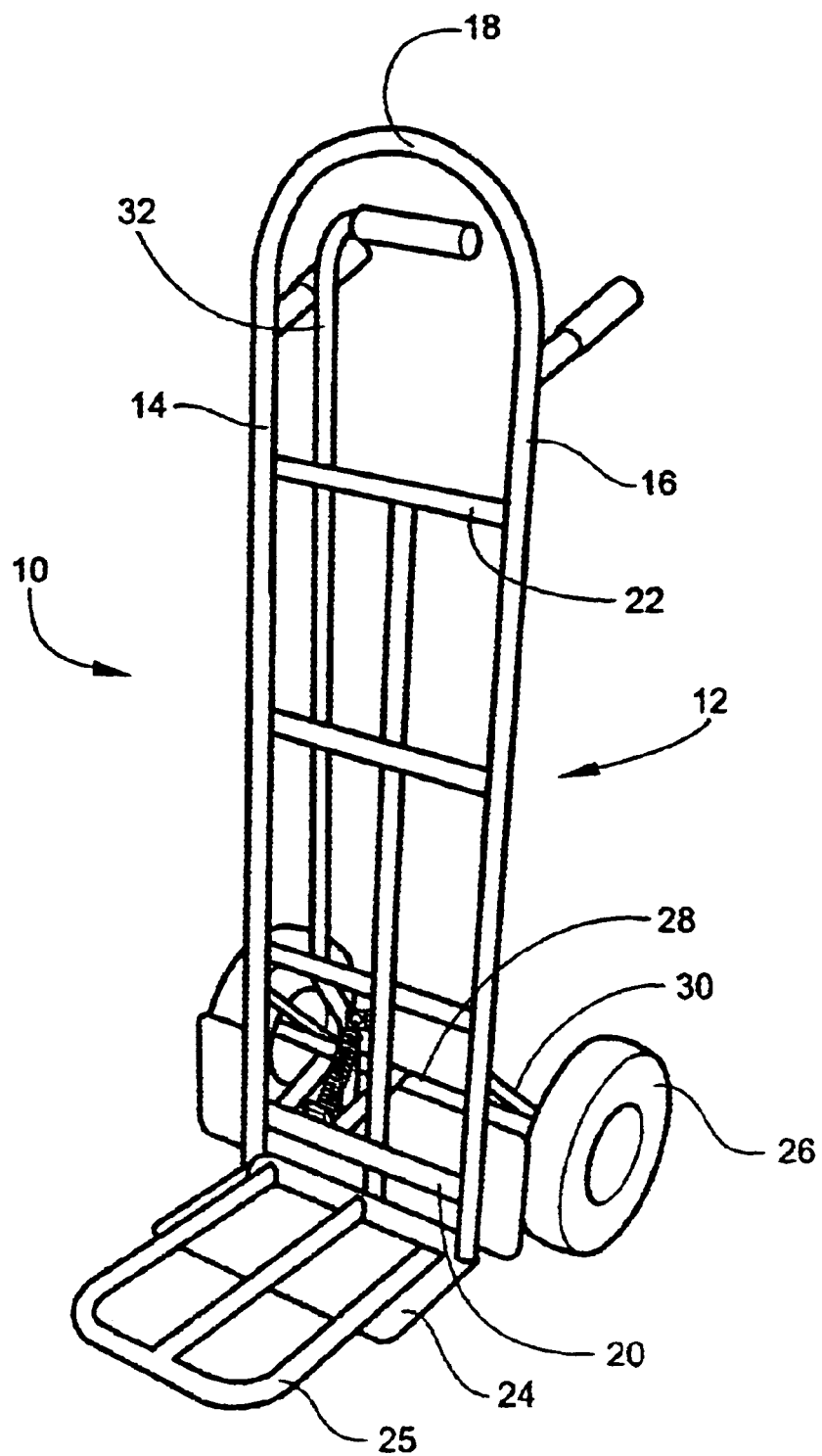
FIG. 1 is a front perspective view of the invention.
Figure 2:
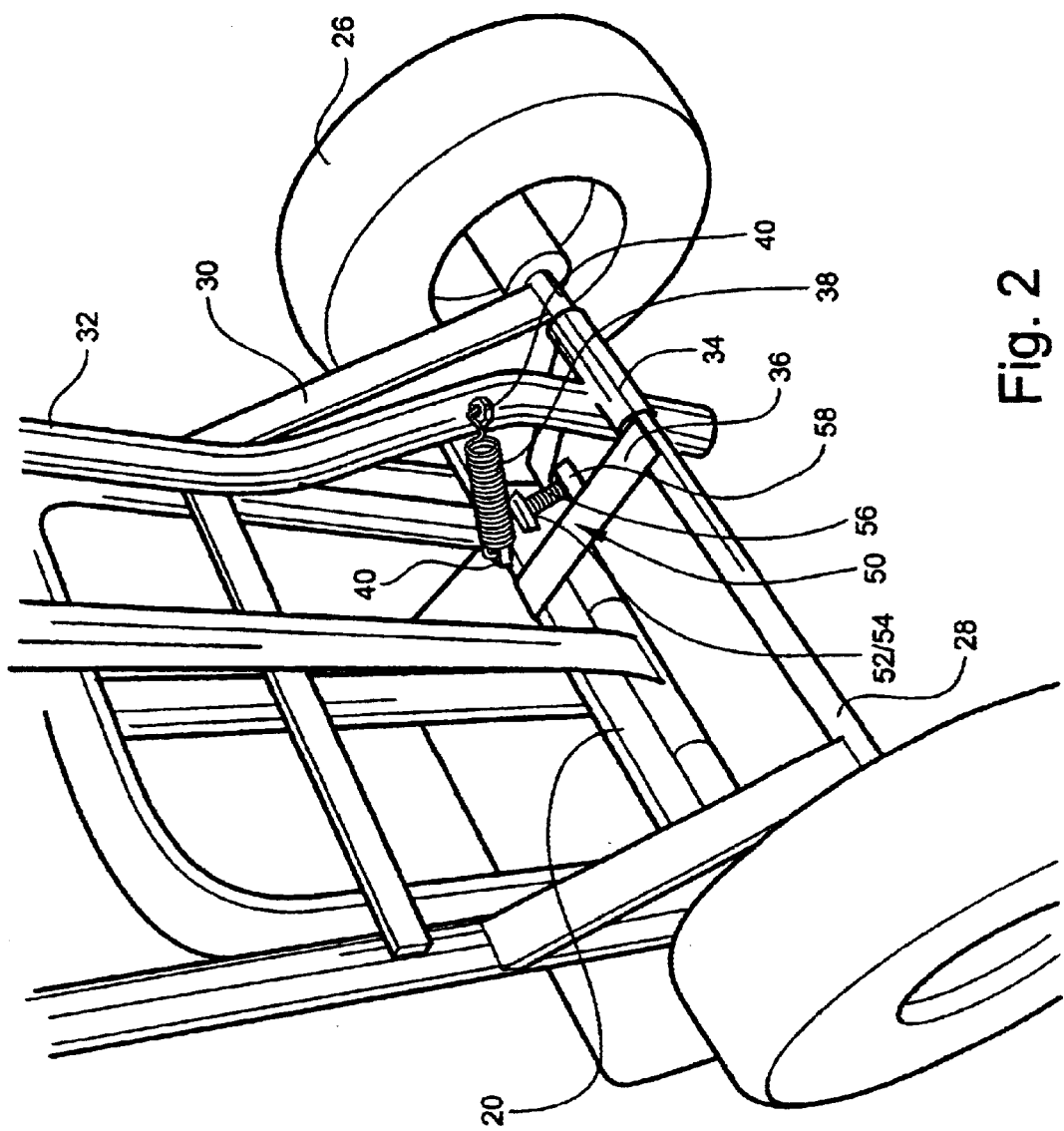
FIG. 2 is a partial, rear perspective view of the invention showing detail of the tilting mechanism in the retracted position.
Figure 3:
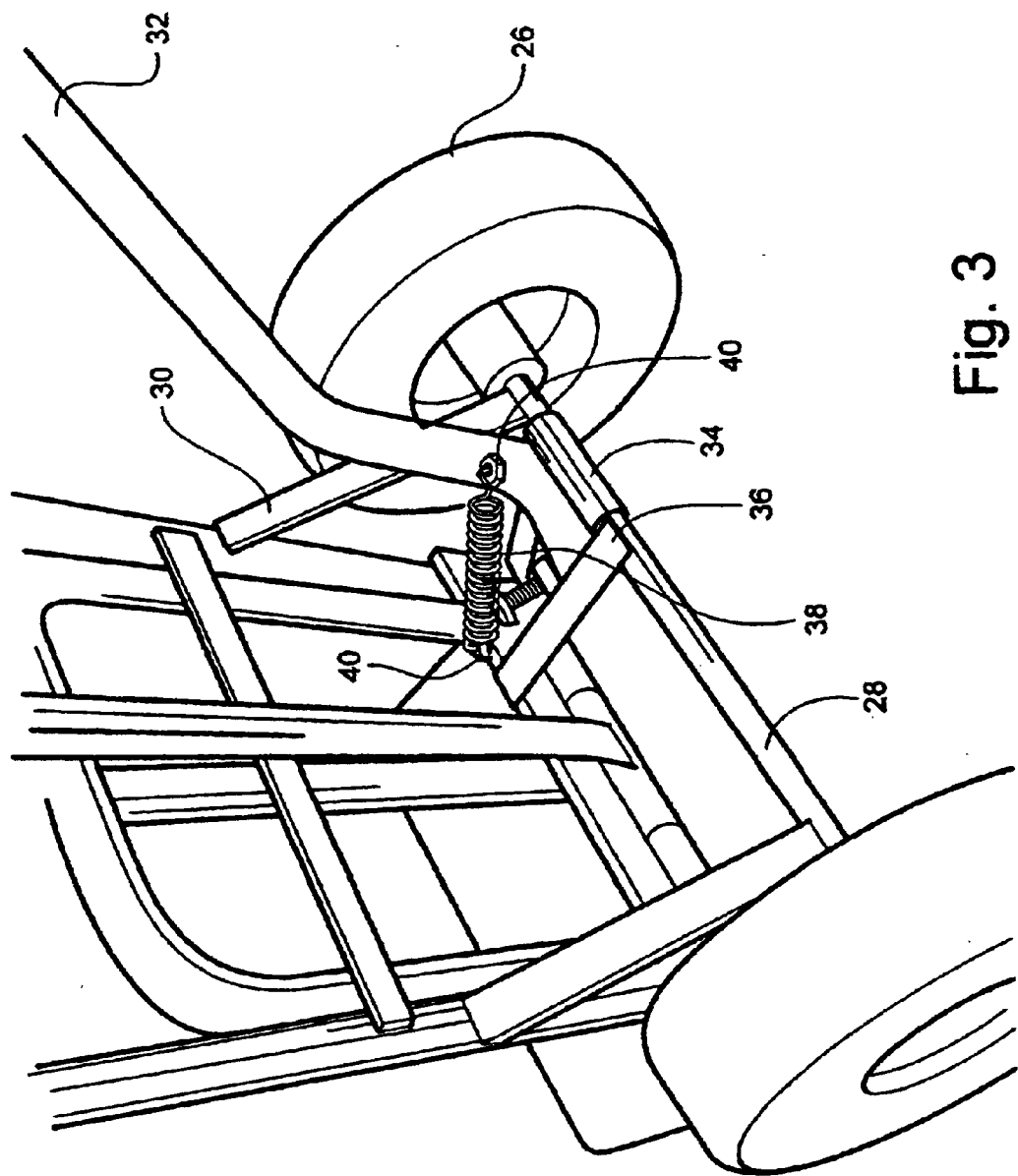
FIG. 3 is a partial, rear perspective view of the invention showing detail of the tilting mechanism in the actuated position.

A preferred embodiment of the invention is shown in FIGS. 1 thru 3. Hand truck 10 comprises an upright load bearing frame 12 of fixed geometry. As employed herein, "fixed geometry" signifies that the frame is formed as a single part, generally monolithic in construction, with no components which move relative to others. Frame 12 is a box style frame, having right and left vertical channels 14, 16 joined by upper and lower cross bars 18, 20. Horizontal braces 22 span vertical channels 14, 16. Frame 12 is typically formed from steel tubing and is typically assembled by welding. Designation of frame 12 as upright signifies that in normal usage, the longitudinal dimension of frame 12 is vertical, or slightly inclined from the vertical.

A toe or load plate 24 is welded or otherwise firmly fixed to frame 12 at the bottom and on the front side of frame 12. Load plate 24 is generally planar. Articles being transported by hand truck 10 are loaded onto load plate 24 and may be propped against frame 12, if desired.

Two carriage wheels 26 are rotatably mounted to frame 12. Frame 12, load plate 24, and wheels 26 are generally conventional, and need not be more explicitly described herein, other than to note that axle 28 and journaled support of the wheels 26, indicated at 30, are located on the rear side of frame 12. Axle 28 establishes an axis of rotation of the wheels 26. It is further noted that attachment and support of the wheels 26 is fixed in location to frame 12. By contrast, some prior art hand trucks (not shown) have axle mountings which are adjustably positioned on their respective frames.

Hand truck 10 is characterized by a novel load shifting arrangement which, when operated, moves the center of gravity of hand truck 10. The load shifting arrangement includes a retracting lever 32, having an upper end and a lower end, substantially parallel to frame 12 in the retracted position, which is rotatably mounted to axle 30 at a fixed point by a sleeve 34. Retracting lever 32 has an "S" curve proximate axle 30, whereby the upper portion of retracting lever 32, while substantially parallel the lower portion of retracting lever 32, it is offset such that it is proximate frame 12. Retracting lever 32 is spaced apart on axle 28 from the location of the carriage wheels 26 by a restraining bar 36. It would be evident to one of ordinary skill in the art that sleeve 34 could extend the length of axle 28 between journaled supports 30 in lieu of a shorter sleeve 34 restrained by a restraining bar 36.

Retracting lever 32 is normally retained in the retracted, substantially vertical, position by a spring 38, spring 38 being attached at retracting lever member 32 and a lower portion of frame 12 at apertures 40.

A lever stop 50 controls the degree of rotation of retracting lever member 32 around axle 28, and thus the degree of rotation of the upper end of retracting lever member 32. Lever stop 50 consists of a flange 52, having a threaded aperture 54 therethru, a threaded rod 56 and a stop head 58. The threading of threaded rod 56 thru threaded aperture 54 adjusts the position of stop head 58 relative to the lower end of retracting lever 32, thereby adjusting the degree of rotation of retracting lever 32 about axle 28. The adjustability of the degree of rotation of retracting lever 32 facilitates use of the load shifting element of hand truck 10 for users of varying height.

By grasping the upper end of retracting lever 32 and pulling toward the user, retracting lever 32 is levered between axle 28 and lever stop 50. Downward pressure exerted on the upper end of retracting lever 32 by the user is transferred to lever stop 50, thereby shifting the center of gravity of the loaded hand truck 10 to assist in tilting the loaded hand truck 10 to a position for movement of hand truck 10. It is an easy matter to tilt hand truck 10 by grasping the upper portion of frame 12 by hand after the weight of hand truck 10 is shifted utilizing retracting lever 32. Conversely, pulling retracting lever 32 to engage lever stop 50 allows hand truck 10 to be returned to the vertical position with less effort on the part of the user.

One of the significant advantages of the present invention is that the hands are left free to control and maneuver hand truck 10 without the user being obliged to attempt to place his or her feet as far away from hand truck 10 as possible in order to develop sufficient mechanical advantage over the weight of hand truck 10, particularly when hand truck 10 is laden.

Figure 4:
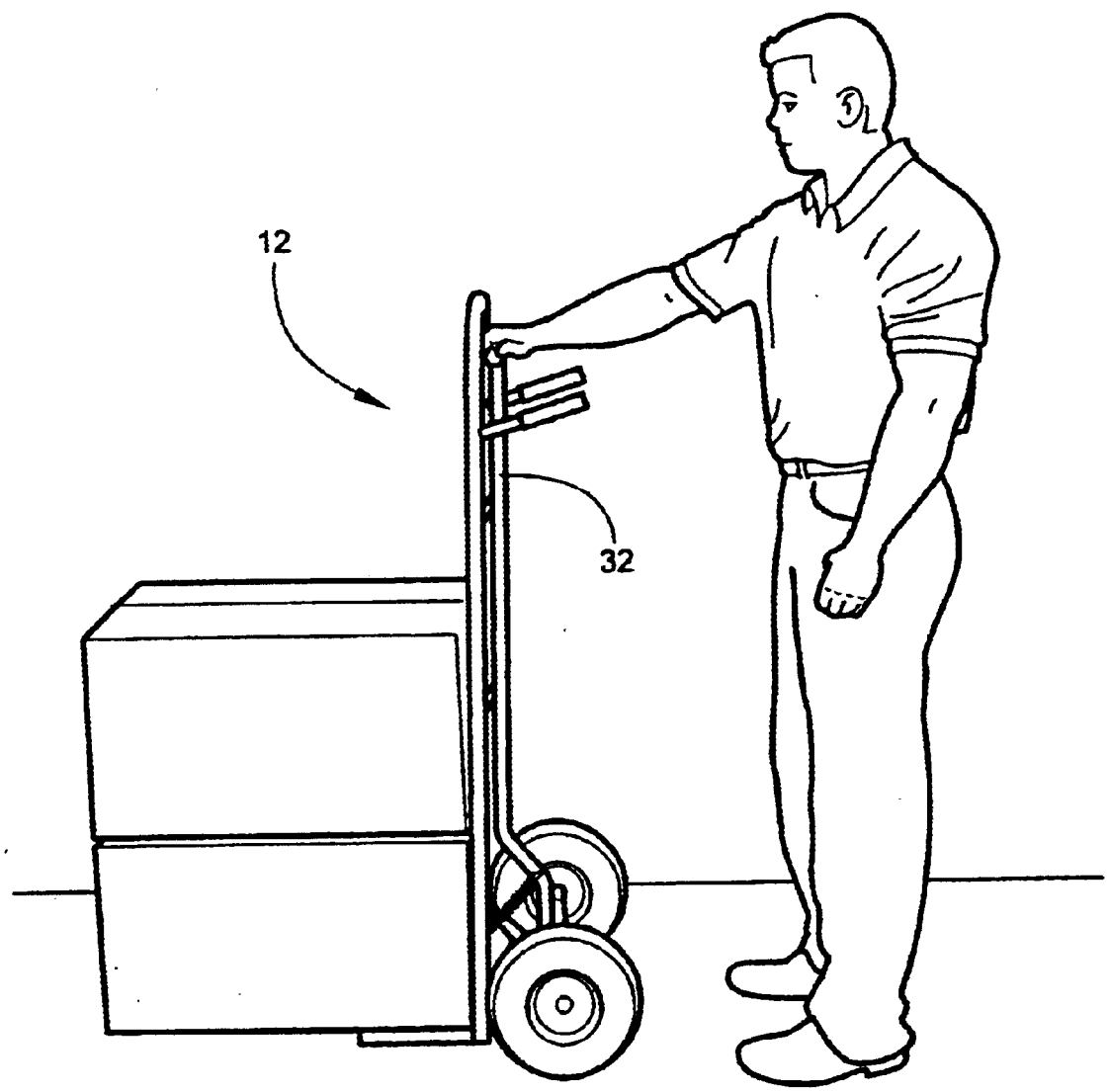
FIG. 4 is a side view of the invention with the hand truck shown, loaded, in an upright position.
Figure 5:
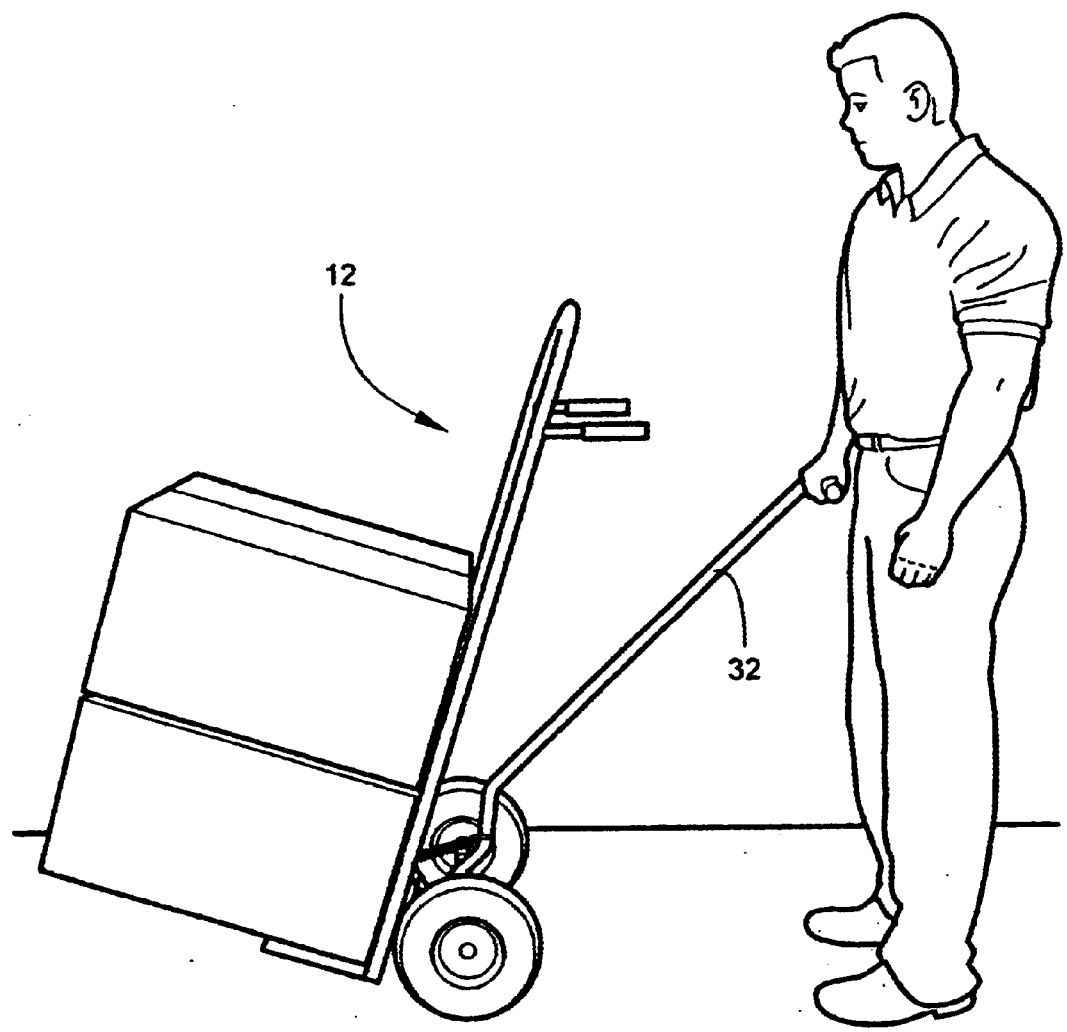
FIG. 5 is a side view of the invention with a user shown operating the retracting lever to tilt the hand truck
Figure 6:
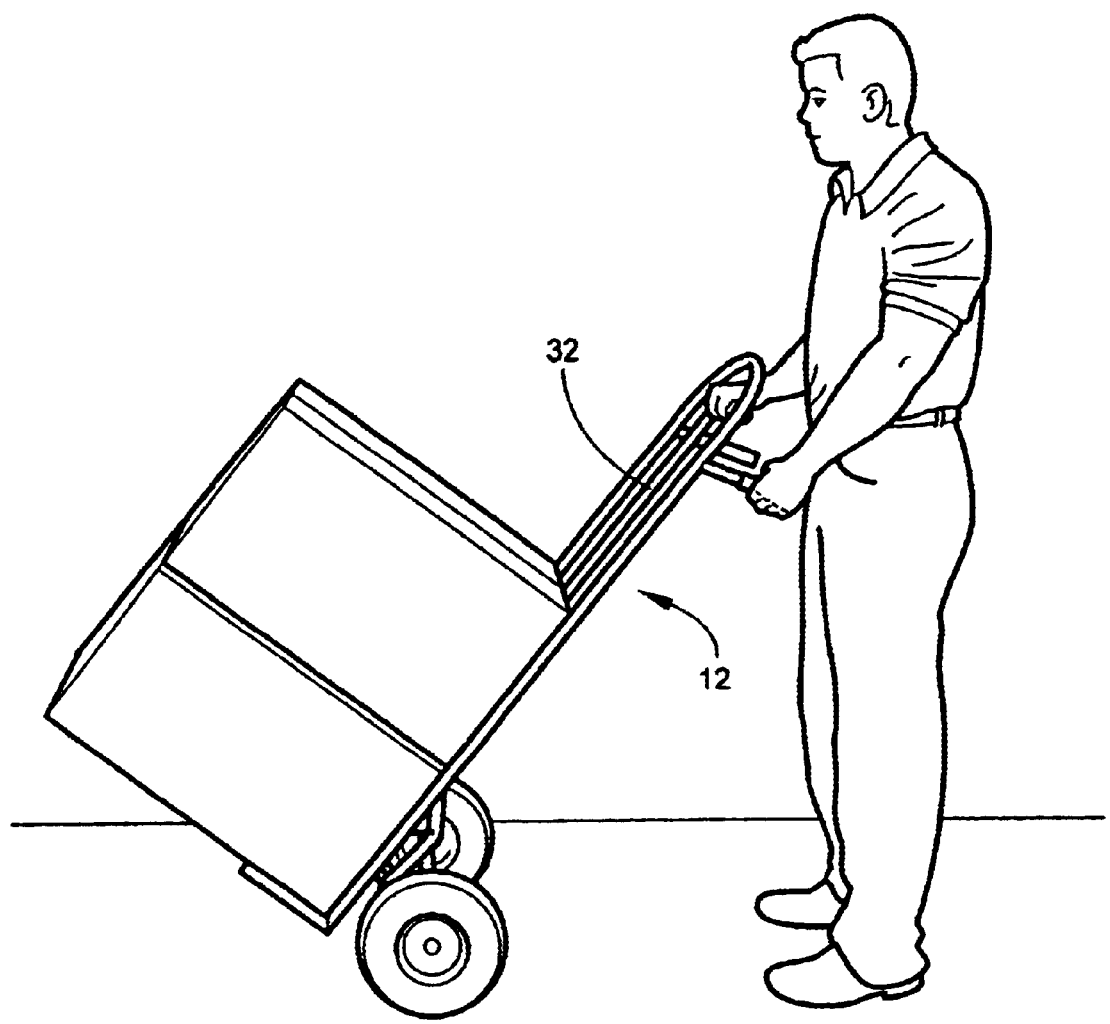
FIG. 6 is a side view of the invention, in a tilted position, with the retracting lever in its retracted position.

FIGS. 4 thru 6 illustrate operation of hand truck 10. Hand truck 10 is shown in FIG. 4 to be laden with bags 2, standing in the upright position on the ground. When a user pulls retracting lever 32 to a point at which it engages lever stop 50, he may more easily tilt hand truck 10 than is possible by using only upper cross bar 18. The user then controls and maneuvers hand truck 10 by grasping the upper portion of load bearing frame 12 with one or both hands 6.

Optionally, in addition to load plate 24, load plate extension 25 is hingedly attached at the juncture of frame 12 and load plate 24, such that load plate extension 25 may be folded up against frame 12, fitting between vertical channels 14 and 16. In the down position, load plate extension 25 rests on the upper surface of load plate 24, extending beyond the forward edge of load plate 24, extending the load bearing surface of the load plate, thereby accommodating larger items. Load plate extension 25 is generally conventional, and need not be more explicitly described herein.

It is to be understood that the present invention is not limited to the embodiments described above, but encompasses any and all embodiments within the scope of the following claims.

I claim:

1. A hand truck comprising:

an upright load bearing frame of fixed geometry having a front side, a load plate rigidly fixed to said load bearing frame at said front side, a rear side, and two carriage wheels rotatably mounted to said load bearing frame at said rear side at a fixed point on said load bearing frame, said carriage wheels having an axis of rotation about an axle therebetween, a load shifting lever, said load shifting lever disposed to move the center of gravity of said load bearing frame, said load shifting lever comprising a retracting lever member rotatably mounted to said axle at a fixed point spaced apart from said carriage wheels, and a load shifting assembly stop positioned on a rear portion of said load plate, said stop adapted to limit the degree of rotation of said load shifting lever about said axle;

a lower end of said retracting lever member positioned to directly contact said stop when an upper end of said load shifting lever is pulled from a retracted position by a user, thereby causing said load plate and the load bearing frame to tilt and moving the center of gravity of said load bearing frame.

2. The hand truck according to claim 1, wherein said axle is disposed in journaled supported relation to said load bearing frame.

3. The hand truck according to claim 2, wherein said retracting lever member is substantially parallel to said load bearing frame in a first, retracted position and substantially oblique to said load bearing frame when in a second, actuated position.

4. The hand truck according to claim 3, further comprising a return spring having a proximal end anchored at said load bearing frame and a distal end anchored at said retracting lever member, wherein said return spring is disposed to urge said retracting lever member into said first, retracted position.

5. The hand truck according to claim 1, wherein said lever stop assembly comprises a threaded rod, said threaded rod engaging a threaded aperture at a lower end of said load bearing frame at a first end and having a lever engaging head at a second end, said stop disposed to limit movement of said retracting lever member to prevent excessive inclination of said frame of said hand truck.

6. The hand truck according to claim 5, further comprising a load plate extension, said load plate extension hingedly attached at a juncture between said load bearing frame and said load plate such that an increased load bearing surface is formed.

7. A hand truck comprising:

an upright load bearing frame of fixed geometry having a front side; a load plate rigidly fixed to said load bearing frame at a lower extreme of said front side; a load plate extension hingedly attached at a juncture of said load plate and said load bearing frame such that an increased load bearing surface is formed; a rear side, and two carriage wheels rotatably mounted to said load bearing frame at said rear side at a fixed point on said load bearing frame, said carriage wheels having an axis of rotation about an axle therebetween, said axle being disposed in journaled supporting relationship to said load bearing frame;

a load shifting lever, said load shifting lever disposed to move the center of gravity of said load bearing frame, said load shifting lever comprising a retracting lever member rotatably mounted to said axle at a fixed point spaced apart from said carriage wheels, said retracting lever being substantially parallel to said load bearing frame in a first, retracted position and substantially oblique to said load bearing frame when in a second, actuated position; and a return spring having a proximal end anchored at said load bearing frame and a distal end anchored at said retracting lever member, wherein said return spring is disposed to urge said retracting lever member into said first retracted position;

a lever stop assembly positioned on a rear portion of said load plate, said lever stop assembly comprising a threaded rod, said threaded rod engaging a threaded aperture at a lower end of said load bearing frame at a first end and having a lever engaging head at a second end, said stop assembly adapted to limit the degree of rotation of said load shifting lever about said axle to prevent excessive inclination of said frame of said hand truck;

a lower end of said load shifting lever positioned to directly contact said stop assembly when an upper end of said load shifting lever is pulled from a retracted position by a user, thereby causing said load plate and the load bearing frame to tilt and moving the center of gravity of said load bearing frame.

* * * * *